United States Patent [19]

Sesser

[11] Patent Number: 4,676,438

[45] Date of Patent: Jun. 30, 1987

[54] FURROW IRRIGATION BUBBLER DEVICE AND SPRAY HEAD CONVERSION ASSEMBLY UTILIZED THEREWITH

[75] Inventor: George L. Sesser, Walla Walla, Wash.

[73] Assignee: Nelson Irrigation Corporation, Walla Walla, Wash.

[21] Appl. No.: 652,471

[22] Filed: Sep. 20, 1984

[51] Int. Cl.[4] .................. A01G 25/09; B05B 1/26; B05B 15/00

[52] U.S. Cl. .................. 239/722; 239/726; 239/391; 239/499; 239/500; 239/524; 239/542; 239/590; 285/319; 285/921

[58] Field of Search ............. 239/31, 714, 715, 499, 239/500, 504, 524, 594, 709–710, 177, 711, 717, 718, 390, 391, 397, 590, 542; 137/505.25; 285/319, 921

[56] References Cited

U.S. PATENT DOCUMENTS

| | | | |
|---|---|---|---|
| D. 259,438 | 6/1981 | Meyer . | |
| 1,165,838 | 12/1915 | Brill | 285/921 X |
| 1,883,656 | 10/1932 | Estock | 239/542 |
| 3,094,141 | 6/1963 | Maienknecht | 137/505.25 |
| 3,603,508 | 9/1971 | Ingram | 239/715 X |
| 3,643,442 | 2/1972 | Houston | 239/177.1 X |
| 3,792,717 | 2/1974 | Tibbals, Jr. | 137/505.25 |
| 3,811,620 | 5/1974 | Gebhardt | 239/504 X |
| 4,091,996 | 5/1978 | Nelson | 239/177.1 |
| 4,135,738 | 1/1979 | Clements | 239/714 X |
| 4,159,805 | 7/1979 | von Lutzow | 239/524 X |
| 4,336,908 | 6/1982 | Vikre | 239/177.1 |
| 4,350,302 | 9/1982 | Gruber et al. | 239/500 |
| 4,382,555 | 5/1983 | Ucinhazska et al. | 239/714 |
| 4,405,085 | 9/1983 | Meyer | 239/177.1 X |
| 4,575,133 | 3/1986 | Nattel | 285/319 |

FOREIGN PATENT DOCUMENTS

1492784 6/1965 France .................. 239/524

OTHER PUBLICATIONS

Irrigation Age, Jan., 1983, "Low Pressure Nozzle" p. 34.
Irrigation Age, Mar., 1983, "Our Super Spray has a Super Warranty" p. 15.

Primary Examiner—Andres Kashnikow
Assistant Examiner—Mary Beth O. Jones
Attorney, Agent, or Firm—Cushman, Darby & Cushman

[57] ABSTRACT

An assembly as used with a drop tube of a moving irrigation system which allows the operator to convert from conventional spray mode operation to furrow bubbler operation. The assembly includes a pressure regulator for regulating the pressure of water to a relatively low value and having an upper end adapted to be connected in water communicating relation to the drop tube and a spray head connected at its upper end in water communicating relation to the lower end of the pressure regulator. The spray head includes a nozzle for directing a water stream downwardly in a direction to be normally interrupted by a removable splash plate into a spray pattern. A tubular structure is connected at its upper end portion with the spray head in a position to receive all of the water stream directed from the nozzle so as to transmit the same downwardly to the lower end thereof. A bubbler device is carried by the lower end of the tubular structure in a position to receive the water in the lower end thereof and deliver the same at extremely low pressure at a position near ground level.

16 Claims, 14 Drawing Figures

FURROW IRRIGATION BUBBLER DEVICE AND SPRAY HEAD CONVERSION ASSEMBLY UTILIZED THEREWITH

This invention relates to agricultural irrigation and, more particularly, to improvements in furrow bubbler irrigation.

The present improvements are particularly applicable to pivot move irrigation systems of the type which have been in popular use for many years and also in the more recently popular lateral move systems. Whereas in years past both of these moving irrigation systems have embodied sprinkler heads of the rotary step-by-step variety, in recent years because of increased energy costs and the scarcity of available irrigation water, it has become more and more popular to operate the system at lower pressures and to utilize non-moving spray heads which minimize the water loss due to evaporation and wind drift.

Step-by-step impact sprinkler heads were originally provided for the purpose of covering the greatest possible area from a single water emitting position. Of course in order to accomplish this objective, it was necessary to utilize a relatively high pressure to project the water outwardly. With the advent of lower pressure systems, the trend has been to cover the same pattern area which heretofore had been covered by a single rotary impact sprinkler with a plurality of spray heads which, of course, necessitated the location of heads throughout the area by means of pipes and tubing. One arrangement for accomplishing this objective was to utilize spray booms on the ends of drop tubes and another was to utilize individual spray heads on individual drop tubes. The utilization of a multiplicity of spray heads in lieu of a single impact sprinkler enabled the water to be distributed to the same pattern area at the same gallonage per minute but at a substantially reduced operating pressure, and since the distance between the position of water emission and the ground pattern was substantially reduced there was also a reduction in wasteful wind drift and evaporation. These advantages can be increased by utilizing moving systems such as pivot move systems and the lateral move systems to emit water directly into furrows. This furrow irrigation with the use of moving irrigation systems enables the water to be distributed at the same gallonage per minute almost directly at ground level so as to be almost totally captured and applied to the portion of the field where it can be more efficiently and effectively used. The water being applied directly into the furrow keeps it off plants at critical times and protects salt sensitive crops from possible salt burn. Also, by controlling the area of wetted soil, wheel tracks remain dry and weed growth is discouraged. Another technique which enhances efficiencies is to emit water into every other furrow.

An object of the present invention is the provision of an assembly for use with a drop tube which allows the operator of the moving irrigation system to utilize the conventional spray mode for germination, chemical applications and cooling and then to simply and easily convert to furrow bubbler operation. In accordance with the principles of the present invention, this objective is obtained by utilizing an assembly which includes a pressure regulator for regulating the pressure of water to a relatively low value and having an upper end adapted to be connected in water communicating relation to the drop tube and a spray head connected at its upper end in water communicating relation to the lower end of the pressure regulator. The spray head includes a nozzle for directing a water stream downwardly in a direction to be normally interrupted by a removable splash plate into a spray pattern. A tubular structure is connected at its upper end portion with the spray head in a position to receive all of the water stream directed from the nozzle so as to transmit the same downwardly to the lower end thereof. A bubbler device is carried by the lower end of the tubular structure in a position to receive the water in the lower end thereof and deliver the same at extremely low pressure at a position near ground level.

Preferably the tubular structure includes a length of flexible tubing having upper and lower ends having similar upper and lower connector tubes connected to the upper and lower ends thereof respectively.

Another object of the present invention is the provision of an improved water bubbler device which is simple in construction, economical to manufacture, and effective in operation. In accordance with the principles of the present invention, this objective is achieved by providing a bubbler device which comprises an annular housing member having means at the upper end thereof for connecting the housing member to a source of water under a relatively low pressure and directing the water source downwardly into the interior of the housing member. A cup member is carried within the interior of the housing member for receiving therein the water directed downwardly into the interior of the housing member and directing the same to pass over the upper peripheral edge thereof into an outer annular portion of the interior of the housing member. An annular plate member is mounted in the interior of the housing member below the cup member in a position to direct the water in the outer annular portion through a central orifice formed in the plate member. A spray target structure is carried by the housing member in a position below the orifice and below a lower annular end of the housing member such that the water passing downwardly through the orifice engages the spray target and is deflected outwardly.

These and other objects of the present invention will become more apparent during the course of the following detailed description and appended claims.

The invention may be best understood with reference to the accompanying drawings, wherein an illustrative embodiment is shown.

Figures 1, 2, 3:
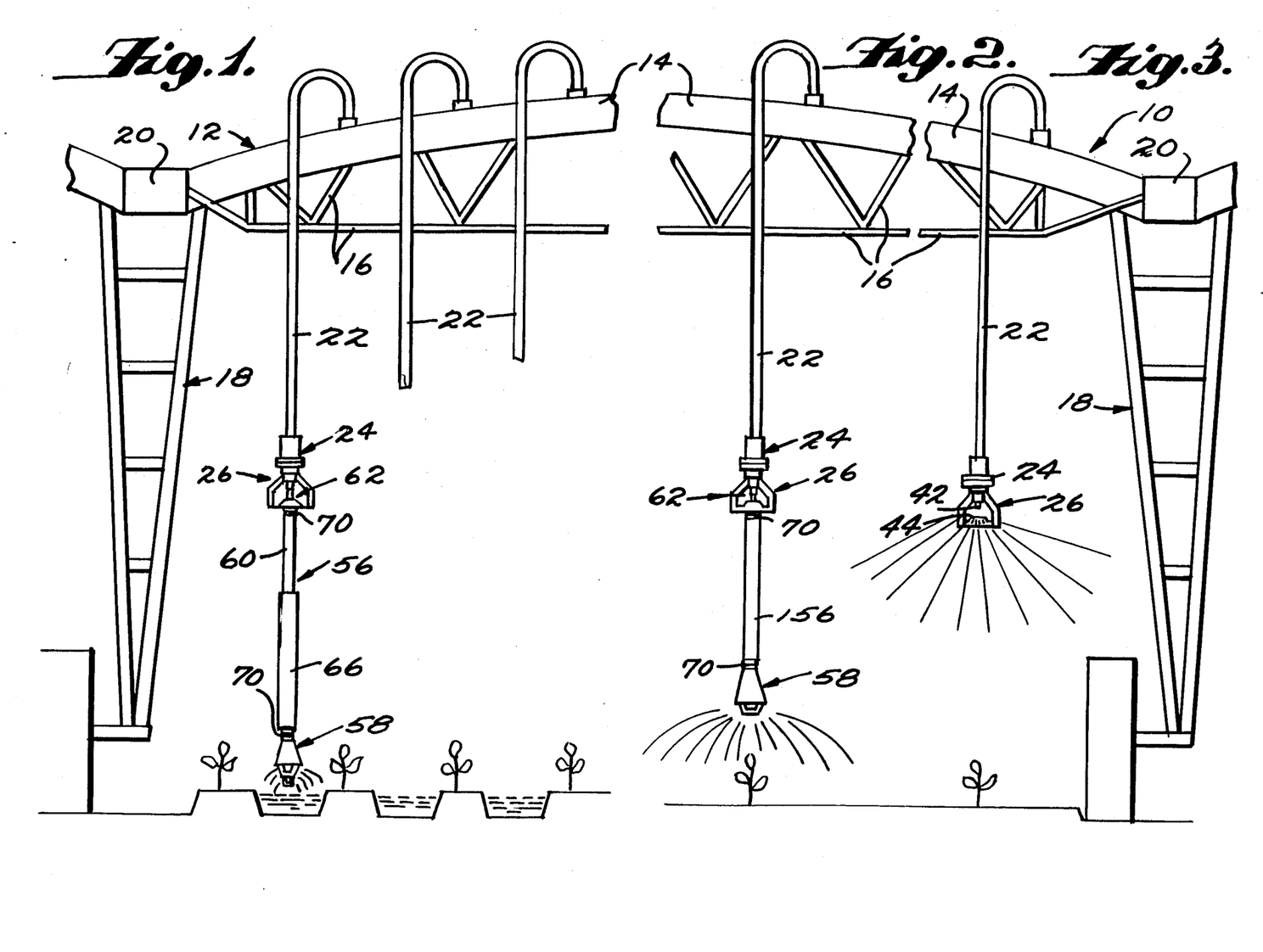
FIG. 1 is a fragmentary front elevational view of a moving irrigation system having a drop tube onto which the assembly embodying the principles of the present invention has been mounted, the assembly being shown in its furrow bubbler mode of operation.
FIG. 2 is a view similar to FIG. 1 showing the assembly modified for use in a intermediate sprinkler mode.
FIG. 3 is a view similar to FIG. 1 showing the assembly modified for use in a conventional spray head mode.

Referring now more particularly to FIGS. 1-3 of the drawings, there is shown therein portions of a movable irrigation system, generally indicated at 10. The system 10, as shown, is a conventional pivot move system, although it could just as readily be a lateral move system if desired. Both of these systems embody a multiplicity of conduit truss span assemblies 12, which include a main conduit 14 and a series of brace members 16 connected with the conduit to form a truss span. Each end of each conduit truss span is associated with a wheeled tower, generally indicated at 18 (except the innermost conduit truss span assembly in the case of a pivot move system). In addition, each end of each conduit except for the end conduits are connected together by a coupling 20 which accommodates a limited amount of relative movement between the adjacent conduit truss span assemblies, all of which is conventional and well known. In accordance with known practice, the innermost end of the innermost conduit 14 of the pivot move system is swivelly mounted on an upstanding supply pipe (not shown). This connection serves to guide the innermost end of the system and to supply the successive conduits 14 in the system with water for irrigation.

FIG. 3 illustrates a typical known spray head installation used in conjunction with a pivot move or lateral move system. As shown, a goose neck drop tube 22 communicates its upper end with the interior of the associated conduit 14 and extends downwardly to an intermediate position between the ground level and the elevated level of the conduit 14. Secured to the lower end of the goose neck drop tube assembly 22 is a water pressure regulator 24. The lower end of the pressure regulator 24 has a spray head, generally indicated at 26, connected in water communicating relation therewith. The pressure regulator 24 and spray head 26 also form components of the assembly, embodying the principles of the present invention. Accordingly, the pressure regulator 24 and spray head 26 may assume any known configuration. However, a preferred configuration of both of these components is disclosed in commonly assigned U.S. patent application, Ser. No. 600,078, filed Apr. 13, 1984, the disclosure of which is hereby incorporated by reference into the present specification.

Figure 4:
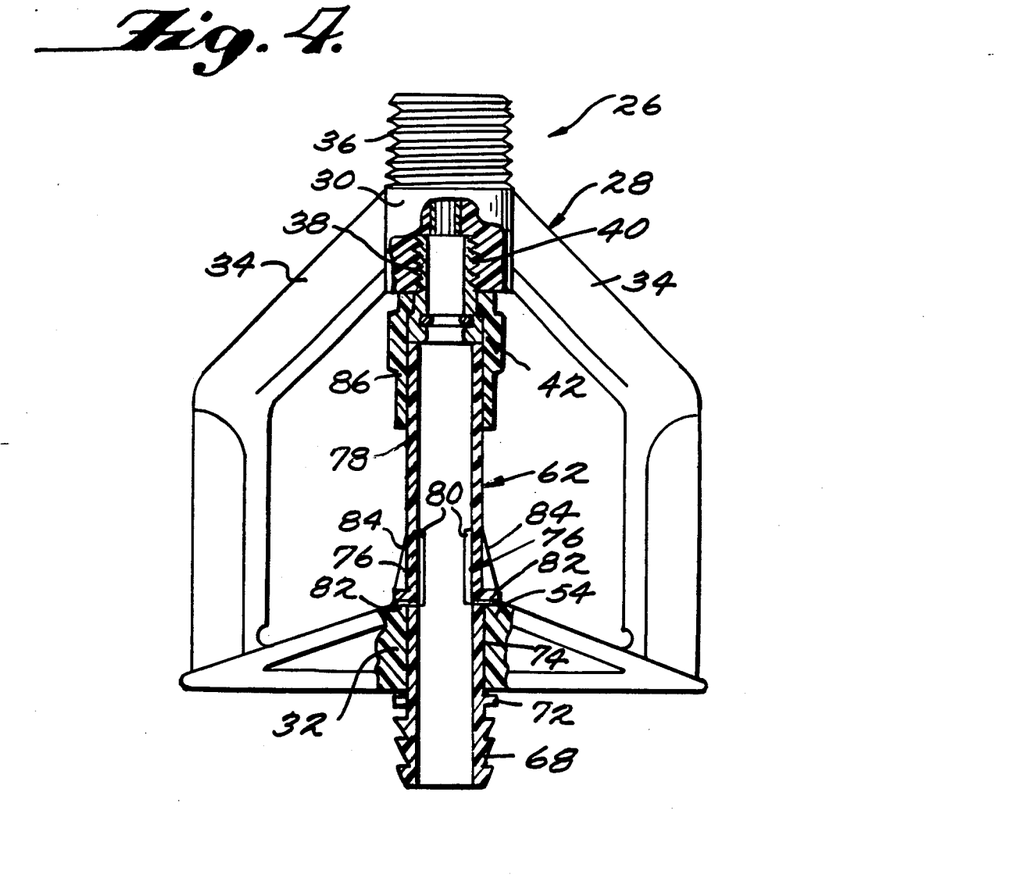
FIG. 4 is a front elevational view, with parts broken away and in section, of the spray head component with its removable target plate removed and a connector tube attached thereto.

As best shown in FIG. 4, the spray head 26 includes a frame structure 28, which is preferably molded of plastic material so as to include an upper sleeve portion 30 and a spaced lower sleeve portion 32. The sleeve portions 30 and 32 are fixed in spaced relation by a pair of angularly shaped mounting arm portions 34. The upper end of the mounting arm portions 34 are integrally connected with the upper sleeve portion 30 and extend outwardly and downwardly from opposite sides thereof. The arm portions then extend downwardly in generally parallel relation with respect to one another, and finally extend inwardly at right angles toward one another so as to be integrally connected with opposite sides of the sleeve portion 32.

The upper exterior surface of the upper sleeve portion 30 is formed with exterior threads 36 which serve to connect the spray head 26 within the lower end of the pressure regulator 24. The lower portion of the upper sleeve portion 30 is formed with interior threads 38 for receiving cooperating exterior threads 40 on the upper ends of a nozzle 42. Nozzle 42 may be a conventional nozzle, as shown, or, where the pressure regulator is not used, it may be a flow control nozzle constructed in accordance with the teachings of commonly assigned U.S. Pat. No. 4,091,996, the disclosure of which is hereby incorporated by reference into the present specification.

Figure 5:
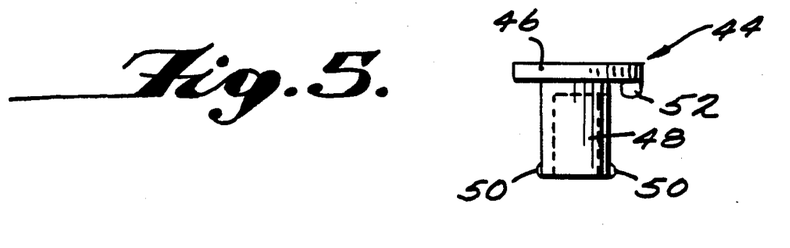
FIG. 5 is a front elevational view of a removed target plate normally used with the spray head shown in FIG. 4.

The nozzle 42 is adapted to receive water flowing through the pressure regulator 24 and into the interior of the upper sleeve portion 30 so as to direct the flow of water downwardly in a stream which is normally interrupted by a removable spray plate, generally indicated at 44, into a spray pattern, such as shown in FIG. 3. Spray plate 44, which is normally mounted within the lower sleeve portion 32, is shown removed from the sleeve portion in FIG. 5. As shown, the removable spray plate 44 is formed with an upper circular spray plate portion 46 having a hollow tubular portion 48 extending downwardly therefrom of a size to extend through the lower sleeve portion 32. A pair of projections 50 are provided at the lower end of the tubular portion 48 for engaging below the bottom of the sleeve portion 32 so as to removably retain the spray plate 44 in a position with its circular spray plate portion 46 above the lower sleeve portion so as to be engaged by the water stream issuing from the nozzle 42. A projection 52 extends downwardly from the circular plate portion 46 for engagement within a recess 54 in the upper end of the lower sleeve portion 32 so as to lock and retain the spray plate in its operative position within the lower sleeve portion 32.

In accordance with the principles of the present invention, the assembly of the present invention includes as components in addition to the pressure regulator 24 and spray head 26, a tubular structure, generally indicated at 56, which is connected to its upper end with the spray head 26 in a position to receive all of the water stream directed from the nozzle 42 so as to transmit the same downwardly to the lower end thereof. The assembly of the present invention also includes as a component thereof, a water bubbler device 58 which is carried at the lower end of the tubular structure 56, preferably in a position to receive the water in the lower end thereof and deliver the same at extremely low pressure at a position near ground level, as shown in FIG. 1.

Preferably, the tubular structure 56 includes a length of flexible tubing 60 having an upper connector tube, generally indicated at 62, at its upper end, which serves to connect the flexible tubing to the spray head 26 and a connector tube 64 at its lower end which serves to connect the same to the water bubbler device 58. The tubular structure 56 may also include a metal tube 66 which is mounted in surrounding relation to the lower end of the flexible tubing 60 so as to stabilize the same during movement of the assembly of the present invention with the irrigation system 10.

Figures 6, 9, 10:
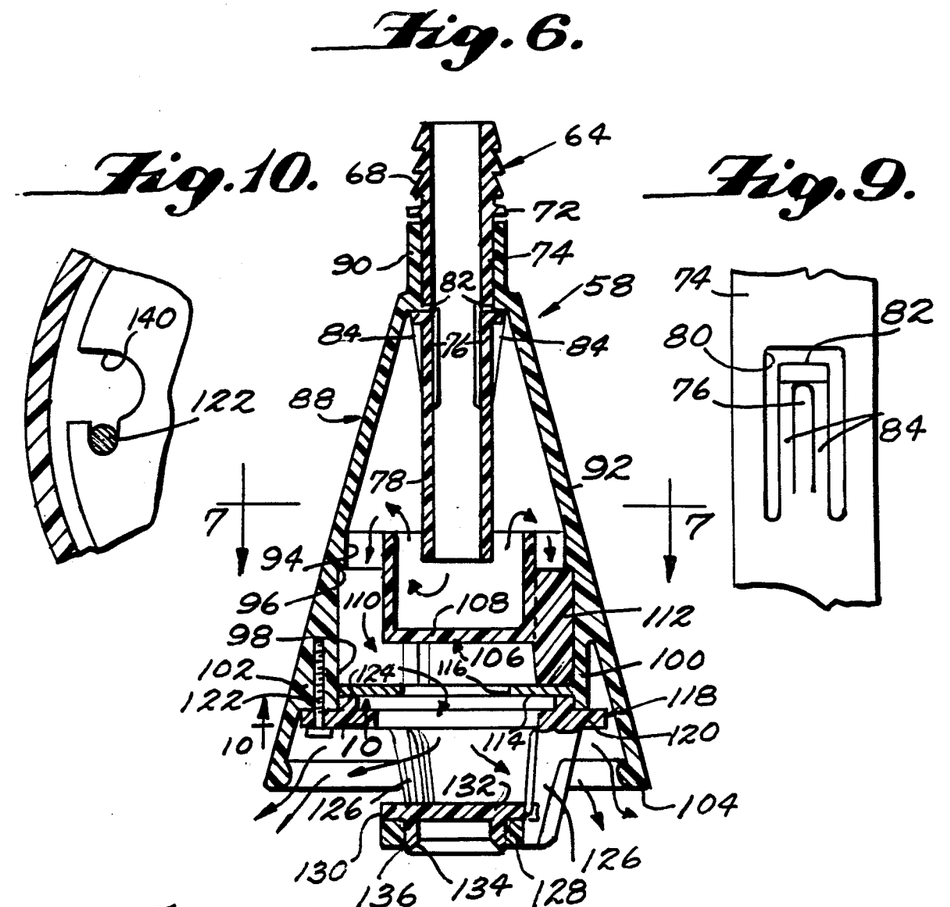
FIG. 6 is a vertical sectional view of the water bubbler device of the assembly.
FIG. 9 is an enlarged fragmentary front elevational view of one of the spring tabs of the connector tube associated with the bubbler device.
FIG. 10 is an enlarged fragmentary sectional view taken along the line 10—10 of FIG. 6.
Figure 7:
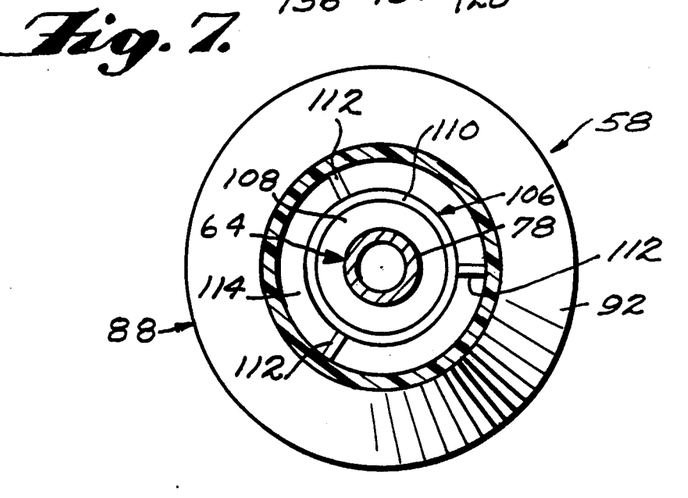
FIG. 7 is a sectional view taken along the line 7—7 of FIG. 6.

Preferably, the connector tubes 62 and 64 are of similar construction, being formed of a plastic molding of a suitable plastic material such as acetal resin. As best shown in FIGS. 4 and 6, each connector tube includes an end portion 68 having its exterior periphery formed to facilitate the accomplishment of the connection with the flexible tubing 60. As shown, the exterior periphery of the end portion 68 is configured to provide a series of annular ridges of barbed shaped cross-sectional configuration which are adapted to enter within the interior of the associated flexible tubing. The connection may be completed by providing suitable strapping 70 around the exterior to the tubing end.

Each connector tube includes an annular flange 72 on the exterior periphery thereof adjacent the end portion 68. Each flange defines one end of an exterior peripheral connecting portion 74, the opposite end of which is defined by a pair of diametrically opposed spring tab elements, generally indicated at 76. These spring tab elements 76 are formed in an elongated opposite end portion 78 of each connector tube.

As best shown in FIG. 9, each spring tab 76 is in the form of an integral spring finger mounted within an opening 80 formed in the adjacent portion of the connector tube side wall. Each spring finger is integrally joined at one end with a portion of the side wall defining the opening 80 and extends axially therefrom in a direction toward the associated intermediate portion 74. As shown, each spring finger includes a locking surface 82 on the free end thereof which faces toward the associated intermediate portion 74 and a pair of exterior cam surfaces 84 which taper axially and upwardly to the locking surface 82.

As best shown in FIG. 4, the connector tube 62 is connected with the spray head 26 by extending the elongated end portion 78 through the lower sleeve portion 32. When the cam surfaces 84 of the spring fingers 76 engage the lower exterior periphery of the sleeve portion 32, the spring fingers are deflected inwardly carrying with them the locking surfaces 82. Just prior to the engagement of the flange 72 with the lower surface of the sleeve portion 32, locking surfaces 82 pass upwardly beyond the upper end of the sleeve portion 32 and are moved outwardly by virtue of the resiliency of the spring fingers 76. The elongated end portion 78 is thus retained in a position of substantial abutting engagement and axial alignment with the nozzle 42. In order to stabilize the position of the elongated end portion 78 with respect to the nozzle 42, an adapter sleeve 86 is mounted in surrounding relation to the nozzle 42 in a position to extend downwardly therefrom. In this way, when the upper extremity of the elongated end portion 78 of the connector tube 62 is moved upwardly toward the nozzle, it is first engaged within the downwardly extending portion of the adapter tube 86.

Referring now more particularly to FIGS. 6 through 10, it will be noted that the water bubbler device 58 is formed with a housing structure, generally indicated at 88. The housing structure includes a cylindrical sleeve portion 90 at its upper end. The housing structure 88 extends downwardly from the upper cylindrical sleeve portion 90 in the form of a frustoconical hollow member 92 disposed with its axis extending vertically and so as to diverge downwardly.

As best shown in FIG. 6, the connector tube 64 is connected with the housing structure 88 of the bubbler device 58 by extending the elongated end portion 78 thereof downwardly through the sleeve portion 90 until the cam surfaces 84 of the spring fingers 76 are engaged with the upper inner periphery of the sleeve portion 90. Further movement of the elongated end portion 78 downwardly causes the spring fingers 76 to deflect inwardly by virtue of the engagement of the cam surfaces 84. When the locking surfaces 82 reach a position below the sleeve portion 90, the inherent resiliency of the spring fingers 76 cause the same to move outwardly, thus engaging the locking surfaces 82 below the sleeve portion 90. In this way the connector tube 64 is connected with the bubbler device 58 by capturing the intermediate tube portion 74 within the bubbler housing portion 90 between the locking surfaces 82 and annular flange 72.

It will be noted that when the connector tube 64 is connected with the bubbler housing structure 88, as stated above, the water flowing through the connector tube 64 will discharge therefrom at a position within the central interior of the housing structure 88. The adjacent coextensive interior configuration of the housing structure 88 is frustoconical. However, at a position adjacent the lower extremity of the elongated tube end portion 78, the interior of the housing structure is formed with a cylindrical peripheral surface, as indicated at 94. At a position slightly below the lower extremity of the connector tube 64, the cylindrical interior configuration ends in a radially outwardly extending annular shoulder 96. From the shoulder 96, the interior configuration is again formed with cylindrical peripheral surface, as indicated at 98. The lower end portion of cylindrical surface 98 is defined by a depending annular interior skirt 100. A series of annularly spaced integral ribs 102 serve to retain the skirt in fixed inwardly spaced relation with respect to the lower end portion of the frustoconical housing member 92. As shown, the lower end portion of the housing member 92 extends downwardly beyond the lower end of the skirt 100 and has its extremity beaded, as indicated at 104.

Mounted within the central interior of the housing member 92 is a cup member, generally indicated at 106. The cup member 106 includes a circular bottom wall 108 having a cylindrical wall 110 extending upwardly from its outer periphery. Formed integrally on the exterior of the peripheral wall 110 in a position below the upper extremity thereof is a series of annularly spaced mounting ribs 112. The exterior surfaces of the ribs 112 are configured to engage the cylindrical surface 98 of the housing member 92. When the cup member 106 is moved upwardly through the bottom of the housing member 92, the outer upper edges of the ribs 112 will move into engagement with the annular shoulder 96. In this position, the bottom wall 108 is disposed below the lower extremity of the elongated tube end portion 78 so as to receive the water issuing therefrom and direct the same outwardly for passage upwardly over the upper edge of the peripheral wall 110.

Mounted within the cylindrical surface 98 of the housing member 92 in a position of engagement below the lower edges of the cup member ribs 112 is a metal orifice plate 114. The orifice plate 114 is of a flat configuration having a cylindrical exterior periphery and a central orifice 116 through which the water flowing over the upper edge of the cup member 106 passes. Mounted in a position below the lower end of the depending skirt portion 100 of the housing member 92 is a spray target plate assembly, generally indicated at 118. As shown, the target assembly 118 includes an upper annular portion 120 which is disposed beneath the skirt portion 100 and fastened in abutting engagement therewith as by a plurality of threaded fasteners 122 extending therethrough and into an associated rib 102. The upper annular mounting portion 120 is formed with an annular spacer portion 124 which extends upwardly within the skirt portion 100 into a position of engagement with the orifice plate 114 so as to maintain the latter together with the cup member 106 in their operative positions within the housing member 92.

The target assembly 118 also includes a series of downwardly and inwardly extending mounting arms 126. The arms 126 are integrally connected at their upper ends with the upper annular portion 120 and have a lower annular portion 128 fixed integrally with their lower ends. Preferably, each mounting arm 126 has its radially inward and outward edges sharpened to facilitate water flow thereby. Mounted within the lower annular portion 128 is a spray plate 130 similar to the spray plate 44 previously described. As shown, spray plate 130 includes a circular spray deflecting plate portion 132, having a tubular portion 134 extending downwardly therefrom for engagement within the lower annular portion 128. Tubular portion 134 includes locking projections 136 which serve to retain the plate portion 132 in its operative position above the lower annular portion 128.

As best shown in FIGS. 11-14, the spray target assembly 118 contemplates the utilization of a two-stage spray plate unit, generally indicated at 138 in lieu of the spray plate 130. As best shown in FIG. 10 in order to facilitate the mounting of the different spray plate units within the lower annular portion 128 of the target assembly 118, the annular mounting portion 120 is formed with a series of peripheral openings 140 which communicate laterally with the openings within the annular portion 120 for receiving the fasteners 122. The openings 140 are of a size to permit the head of the associated fastener 122 to pass therethrough. The arrangement thus enables the annular mounting portion 120 of the spray target assembly 118 to be engaged and disengaged with the fasteners 122 while the latter are maintained in engaged relation with the housing member 92. Thus, to remove the spray target assembly 118 it is necessary merely to back up each of the fasteners 122 slightly from their securing position and to rotate the assembly 118 slightly to an extent sufficient to align the heads of the fasteners 122 with the openings 114. Once in this position it is possible for spray target assembly 118 to be moved axially away from the housing member 92. The reverse procedure is followed to secure the assembly in position.

Figures 8, 11, 12, 13, 14:
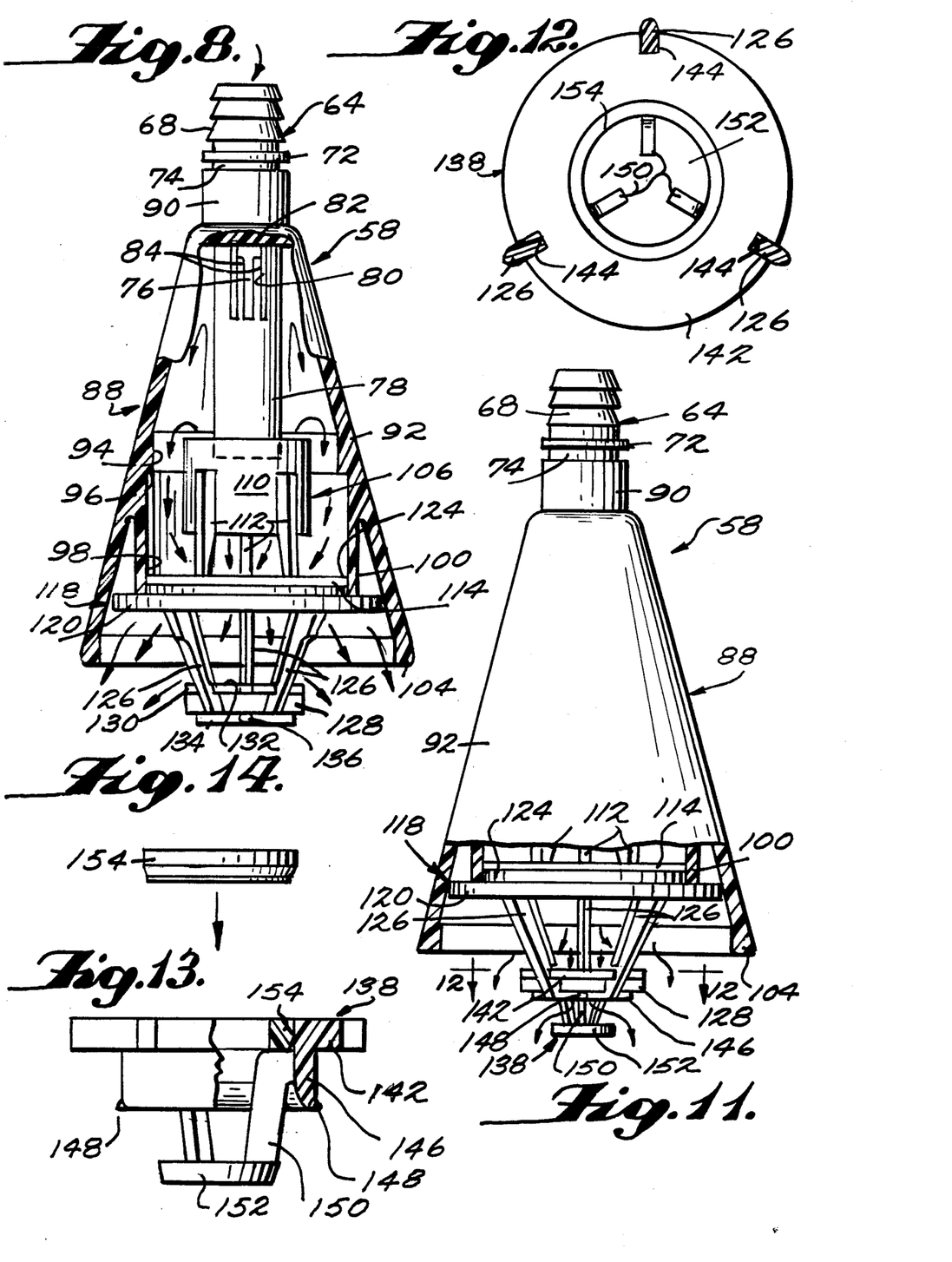
FIG. 8 is a front elevational view of the water bubbler device looking in a direction perpendicular to the plane of the cross-section shown in FIG. 6, with certain parts broken away for purposes of clearer illustration.
FIG. 11 is a view similar to FIG. 8 illustrating the bubbler device with a modified spray target plate assembly.
FIG. 12 is an enlarged fragmentary sectional view taken along the line 12—12 of FIG. 11.
FIG. 13 is a front elevational view of the modified spray target plate assembly with parts broken away for purposes of clearer illustration.
FIG. 14 is a front elevational view of the orifice ring utilized in the assembly shown in FIG. 13.

The two-stage target unit 138 includes an upper annular plate portion 142 having its outer periphery notched, as indicated at 144, to receive the lower ends of the arms 126 therein. Extending downwardly from the inner periphery of the annular spray plate 142 is a tubular portion 146 similar to the tubular portion 134 of the single stage spray plate 130. As before, projections 148, similar to the projections 50, are provided on the lower exterior periphery of the tubular portion 146 to effect securement to the annular portion 128. Formed integrally with the central interior of the tubular portion 146 is a plurality of annularly spaced arms 150 which extend radially inwardly and then radially downwardly from the tubular portion 146. A second stage circular spray plate 152 is integrally formed on the lower end of the arms 150.

In order to more accurately calibrate the proportion of the water which is allowed to flow within the annular spray plate portion 142 downwardly to the second stage circular spray plate 152, there is provided a separate orifice ring 154 which is adapted to engage within the annular plate portion 142 and rests on the upper ends of the arms 150. It will be understood that the orifice ring 154, like the orifice plate 114, may be selected from one of a series of orifice rings and plates having different size orifices.

The two-stage spray plate unit 138 is particularly desirable when the bubbler device is being utilized to distribute water within a furrow in a furrow-irrigation procedure. Such an arrangement is illustrated in FIG. 1, and it will be noted that the pressure regulator 24, which is mounted on the end of goose neck drop tube 22, serves to regulate the pressure of the water coming from the conduit 14 at a relatively low value, as, for example, 10 psi. The water issuing from the pressure regulator 24 at a relatively constant low pressure passes into the spray head 26 and is discharged therefrom through the nozzle 42. The spray from the nozzle is received within the connector tube 62 and in this regard, it will be noted that the spray issuing from the nozzle is maintained without substantial breakup until it passes downwardly of the openings 80 within which spring fingers 76 are mounted within the connector tube 62. While this movement of water past the openings 80 may serve to aspirate a small amount of air through the openings 80, the amount of air so aspirated is insignificant and has no significant effect on the subsequent water flow throughout the assembly.

As previously indicated, the water which is confined within the upper connected tube 62 passes into the upper end of the flexible tubing 60 and flows downwardly through the latter and into the lower connector tube 64. The water discharging from the lower end of the connector tube 64 passes into the central interior of the housing structure 88 of the bubbler device 58. The downward direction of the entering water is changed by engagement of the bottom wall 108 of the cup member 106 which causes the water to flow outwardly and upwardly along the peripheral wall 110 of the cup member. Water then flows outwardly of the upper edge of the peripheral wall 110 into the annular space within the housing member 92 defined by the interior cylindrical surfaces 94 and 96 and the exterior surface of the peripheral wall 110 of the cup member 106. The water in this annular space engages the top surface of the orifice plate 114 and is directed to flow inwardly through the central orifice 116 therein. The water which passes downwardly through the orifice 116 engages the single imperforate spray plate 132 and is deflected outwardly in a circular pattern in a manner similar to that of the spray head 26 except that because of the very low pressure, the diameter of the spray pattern is relatively small. In the case of furrow irrigation, it is preferable to use the two-stage spray plate which concentrates the spray pattern in even a smaller diameter pattern insuring that the water discharged from the bubbler device will enter within the furrow desired. It will be understood that where the field being irrigated is not entirely level, it will be necessary to provide transverse dams within the furrows in order to more evenly retain the water distributed within the furrows by the bubbler device 58 as the irrigation system 10 is moved along the field.

FIG. 2 illustrates the utilization of the assembly of the present invention with a flexible tube 156 instead of the flexible tubing 60. The flexible tube 156 is of a shorter length than the flexible tubing 60 so as to position the bubbler device 58 above the ground level to an extent greater than the bubbler device 58 when undertaking furrow irrigation procedures. As shown in FIG. 2, the bubbler device 58 is provided with the single stage spray target assembly resulting in a slightly larger spray pattern.

While the selection of the spray plate can effect the pattern size, a greater variation in the pattern size irrespective of the spray plate utilized can be secured by changing the orifice plate 114. As the orifice size diminishes, the spray pattern increases.

It can also be seen that by simply removing the connector tube 62 from engagement with the spray head 26 and replacing it with the removed spray plate unit 44, the operator is enabled to readily convert from either furrow irrigation or low pressure spraying to a more conventional spraying operation when desired. The reverse conversion can be readily accomplished by reversing the procedure.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed is:

1. An assembly for mounting on a drop tube of a moving irrigation system comprising:
   a pressure regulator for regulating the pressure of water to a relatively low value and having an upper end adapted to be connected in water communicating relation to the drop tube,
   a spray head connected at its upper end in water communicating relation to the lower end of said pressure regulator, said spray head including
   a nozzle for directing a water stream downwardly in a direction to be normally interrupted by a removable splash plate into a spray pattern,
   a tubular structure connected at its upper end portion with said spray head in a position to receive all of the water stream directed from said nozzle so as to transmit the same downwardly to the lower end thereof, and
   a bubbler device carried by the lower end of said tubular structure in a position to receive the water in the lower end thereof and deliver the same at extremely low pressure at a position near ground level,
   said tubular structure including a length of flexible tubing having upper and lower ends and upper and lower similar connector tubes connected to the upper and lower ends of said flexible tubing,
   each connector tube including
   an end portion having means for connection with the associated end of said flexible tubing, an intermediate exterior peripheral portion and an opposite end portion having annularly spaced spring tab means in the exterior periphery thereof,
   said spray head having a sleeve portion disposed below and in axial alignment with said nozzle within which the removable splash plate is normally mounted,
   said upper connector tube having its opposite end portion extended upwardly through said spray head sleeve portion to an extend sufficient to locate (1) the opposite end portion of said upper connector tube in stream receiving relation to said nozzle, (2) the intermediate portion of said upper connector tube within said spray head sleeve portion and (3) the spring tab means of said upper connector tube in downward movement restraining relation with respect to said sprayhead sleeve portion,
   said bubbler device including an annular housing member having a sleeve portion in its upper end,
   said lower connector tube having its opposite end portion extended downwardly through the bubbler head sleeve portion to an extent sufficient to locate (1) the opposite end portion of said lower connector tube within the interior of said housing member (2) the intermediate portion of said lower connector tube within said bubbler sleeve portion and (3) the spring tab means of said lower connector tube in upward movement restraining relation with respect to said bubbler sleeve portion,
   said bubbler device further including a cup member carried within the interior of said housing member for receiving therein the water directed downwardly into the interior of said housing member, an annular plate member in the interior of said housing member below said cup member in a position to direct the water in said outer annular housing portion through a central orifice formed in said plate member and spray target means carried by said housing member in a position below said orifice and below a lower annular end of said housing member such that the water passing downwardly through said orifice engages said spray target means and is deflected outwardly.

2. An assembly as defined in claim 1 wherein said housing member includes downwardly facing shoulder means therein, said cup member having a plurality of annularly spaced integral mounting ribs extending outwardly and downwardly therefrom, said ribs having upwardly facing surfaces engaging said downwardly facing shoulder means and downwardly facing surface means engaging upwardly facing surface means of said plate member, said spray target means including an upper annular portion engageable upwardly with said plate member and fastener means for securing said upper annular portion with said housing member.

3. An assembly as defined in claim 2 wherein said spray target means includes a plurality of annularly spaced arm portions integrally interconnected with said upper annular portion and extending downwardly therefrom, a lower annular portion integrally interconnected with the lower ends of said arm portions, and separate spray target plate means fixedly carried by said lower annular portion.

4. An assembly as defined in claim 3 wherein said separate spray target plate means includes a single circular imperforate spray plate covering said lower annular portion.

5. An assembly as defined in claim 3 wherein said separate spray target plate means includes an upper annular spray plate covering said lower annular portion, said upper annular spray plate having a plurality of annularly spaced inwardly and downwardly extending arm portions thereon and a lower circular spray plate on the lower ends of said inwardly and downwardly extending arm portions.

6. An assembly as defined in claim 5 wherein said spray target plate means includes an annular orifice defining ring fixed within said upper annular spray plate above the inwardly and downwardly extending arm portions thereon.

7. An assembly as defined in claim 1 wherein said tubular structure includes a stabilizing weight in the form of a metal tube disposed in surrounding relation thereto adjacent the lower end thereof.

8. A water bubbler device for delivering water at extremely low pressure at a position near ground level comprising:

an annular housing member, means at the upper end of said housing member for connecting said housing member to a source of water under a relatively low pressure and directing said water source downwardly into the interior of said housing member, a cup member carried within the interior of said housing member for receiving therein the water directed downwardly into the interior of said housing member and directing the same to pass over the upper peripheral edge thereof into an outer annular portion of the interior of said housing member, an annular plate member in the interior of said housing member below said cup member in a position to direct the water in said outer annular portion through a central orifice formed in said plate member, and spray target means carried by said housing member in a position below said orifice and below a lower annular end of said housing member such that the water passing downwardly through said orifice engages said spray target means and is deflected outwardly.

9. A water bubbler device as defined in claim 8 wherein said housing member is of generally frustoconical configuration disposed so as to diverge downwardly.

10. A water bubbler device as defined in claim 8 wherein the upper end of said housing member is formed with a generally cylindrical sleeve portion, a connector tube having an upper end portion formed with said water source connecting means thereon, said tube having a lower end portion configured to extend downwardly through the sleeve portion of said housing member so that an intermediate portion thereof is disposed within the sleeve portion of the housing member, and annularly spaced spring tab means formed in the exterior periphery of the lower end portion of said tube for retaining the intermediate portion of said tube within the sleeve portion of said housing member after the lower end portion of said tube has been inserted therethrough.

11. A water bubbler device as defined in claim 10 wherein said connector tube is formed with annularly spaced openings in the side wall thereof within which the annularly spaced spring tab means thereof are mounted, each spring tab means comprising an elongated spring finger within an associated tube opening, each spring finger having one end thereof formed integrally with the side wall of the tube defining the associated opening and an opposite end extended to a position adjacent the associated intermediate tube portion, each spring finger having a locking surface on the opposite end thereof facing in the direction of the associated intermediate tube portion and an exterior cam surface leading thereto.

12. A water bubbler device as defined in claim 10 wherein said housing member includes downwardly facing shoulder means therein, said cup member having a plurality of annularly spaced integral mounting ribs extending outwardly and downwardly therefrom, said ribs having upwardly facing surfaces engaging said downwardly facing shoulder means and downwardly facing surface means engaging upwardly facing surface means of said plate member, said spray target means including an upper annular portion engageable upwardly with said plate member and fastener means for securing said upper annular portion with said housing member.

13. A water bubbler device as defined in claim 12 wherein said spray target means includes a plurality of annularly spaced arm portions integrally interconnected with said upper annular portion and extending downwardly therefrom, a lower annular portion integrally interconnected with the lower ends of said arm portions, and separate spray target plate means fixedly carried by said lower annular portion.

14. A water bubbler device as defined in claim 13 wherein said separate spray target plate means includes a single circular imperforate spray plate covering said lower annular portion.

15. A water bubbler device as defined in claim 13 wherein said separate spray target plate means includes an upper annular spray plate covering said lower annular portion, said upper annular plate having a plurality of annularly spaced inwardly and downwardly extending arm portions thereon and a lower circular spray plate on the lower ends of said inwardly and downwardly extending arm portions.

16. A water bubbler device as defined in claim 15 wherein said spray target plate means includes an annular orifice defining ring fixed within said annular spray plate above the inwardly and downwardly extending arm portions thereon.

* * * * *